US007480286B2

(12) United States Patent
Wong

(10) Patent No.: US 7,480,286 B2
(45) Date of Patent: Jan. 20, 2009

(54) METHOD AND APPARATUS FOR PROVIDING WEB SERVICE ACCESS TO TELEPHONY FUNCTIONALITY

(75) Inventor: Johnny Wong, Richmond, CA (US)

(73) Assignee: Oracle International Corporation, Redwood Shores, CA (US)

( * ) Notice: Subject to any disclaimer, the term of this patent is extended or adjusted under 35 U.S.C. 154(b) by 784 days.

(21) Appl. No.: 10/655,647

(22) Filed: Sep. 4, 2003

(65) Prior Publication Data

US 2004/0246947 A1 Dec. 9, 2004

Related U.S. Application Data

(60) Provisional application No. 60/476,771, filed on Jun. 5, 2003.

(51) Int. Cl.
*H04L 12/66* (2006.01)
(52) U.S. Cl. ...................................... 370/352

(58) Field of Classification Search ................ 370/352
See application file for complete search history.

(56) References Cited

U.S. PATENT DOCUMENTS

| 6,069,890 | A  | * | 5/2000 | White et al. | ................. 370/352 |
| 6,791,970 | B1 | * | 9/2004 | Ng et al. | ..................... 370/352 |
| 6,798,755 | B2 | * | 9/2004 | Lillie et al. | ................. 370/312 |

* cited by examiner

*Primary Examiner*—Rasha S Al-Aubaidi
(74) *Attorney, Agent, or Firm*—Park, Vaughan & Fleming LLP; Edward J. Grundler

(57) ABSTRACT

One embodiment of the present invention provides a system that facilitates web service access to telephony functionality. During operation, the system receives a request at a web service to access the telephony functionality using a Voice Over Internet Protocol (VOIP) network. In response, the system selects an interface to the VOIP network, routes the telephony functionality to a public switched telephone network (PSTN), and accesses the telephony functionality.

12 Claims, 3 Drawing Sheets

METHOD AND APPARATUS FOR PROVIDING WEB SERVICE ACCESS TO TELEPHONY FUNCTIONALITY

RELATED APPLICATION

This application hereby claims priority under 35 U.S.C. §119 to U.S. Provisional Patent Application No. 60/476,771 filed on Jun. 5, 2003, entitled "Unified Telephony Platform," by inventor Johnny Wong.

The subject matter of this application is related to the subject matter in a co-pending non-provisional application by the same inventor as the instant application entitled, "Apparatus and Method for Providing a Unified Telephony Solution," having Ser. No. 10/642,251, and filing date Aug. 14, 2003.

BACKGROUND

1. Field of the Invention

The present invention relates to a system that provides telephony across an Internet Protocol network. More specifically, the present invention relates to a method and an apparatus that facilitates web service access to telephony functionality.

2. Related Art

Many individuals and businesses are turning to the Internet for telephony services in an effort to consolidate all forms of communications under one carrier. Many solutions have been designed to ease the transition to an Internet solution for various services including telephony. These solutions have led to some standardization for telephony services.

The Internet engineering task force (IETF) has created the session initiation protocol (SIP), standard which standardizes methods and procedures used to couple the Internet to the public switched telephone network (PSTN). SIP provides protocols for voice, video, and multi-media sessions between an Internet session and a telephone or videophone on the PSTN. The SIP protocols are similar to the well known hypertext transfer protocol (HTTP) in that both are message based. SIP includes messages for, inter alia, invites, response statuses, and goodbye.

While SIP covers the actions generated within the SIP network, SIP provides no methods for initiating an action from outside the SIP network. For example, there is no standardized method for connecting a user at a web browser to the SIP network. There are many situations where a user at a web browser would like to initiate an action on the SIP network. For example, the user might like to enter his or her telephone number into a web browser and have an action initiated on the SIP network to receive a phone call from a vendor.

Hence, what is needed is a method and an apparatus to facilitate web service access to telephony functionality without the problems described above.

SUMMARY

One embodiment of the present invention provides a system that facilitates web service access to telephony functionality. During operation, the system receives a request at a web service to access the telephony functionality using a Voice Over Internet Protocol (VOIP) network. In response, the system selects an interface to the VOIP network, routes the telephony functionality to a public switched telephone network (PSTN), and accesses the telephony functionality.

In a variation of this embodiment, the VOIP network includes a session initiation protocol (SIP) network.

In a further variation, the interface to the VOIP network includes a SIP servlet.

In a further variation, the SIP servlet is a member of a SIP servlet container.

In a further variation, the SIP servlet is registered with a remote method invocation (RMI) registry.

In a further variation, selecting the interface to the VOIP network involves accessing the RMI registry to select the SIP servlet.

In a further variation, the SIP network is coupled to an H323 network, wherein the H323 network facilitates audio-visual communication on local area networks.

In a further variation, receiving the request at the web service to access the telephony functionality involves receiving the request from a web server on behalf of a user of a web browser.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Web Service Access System

Figure 1:
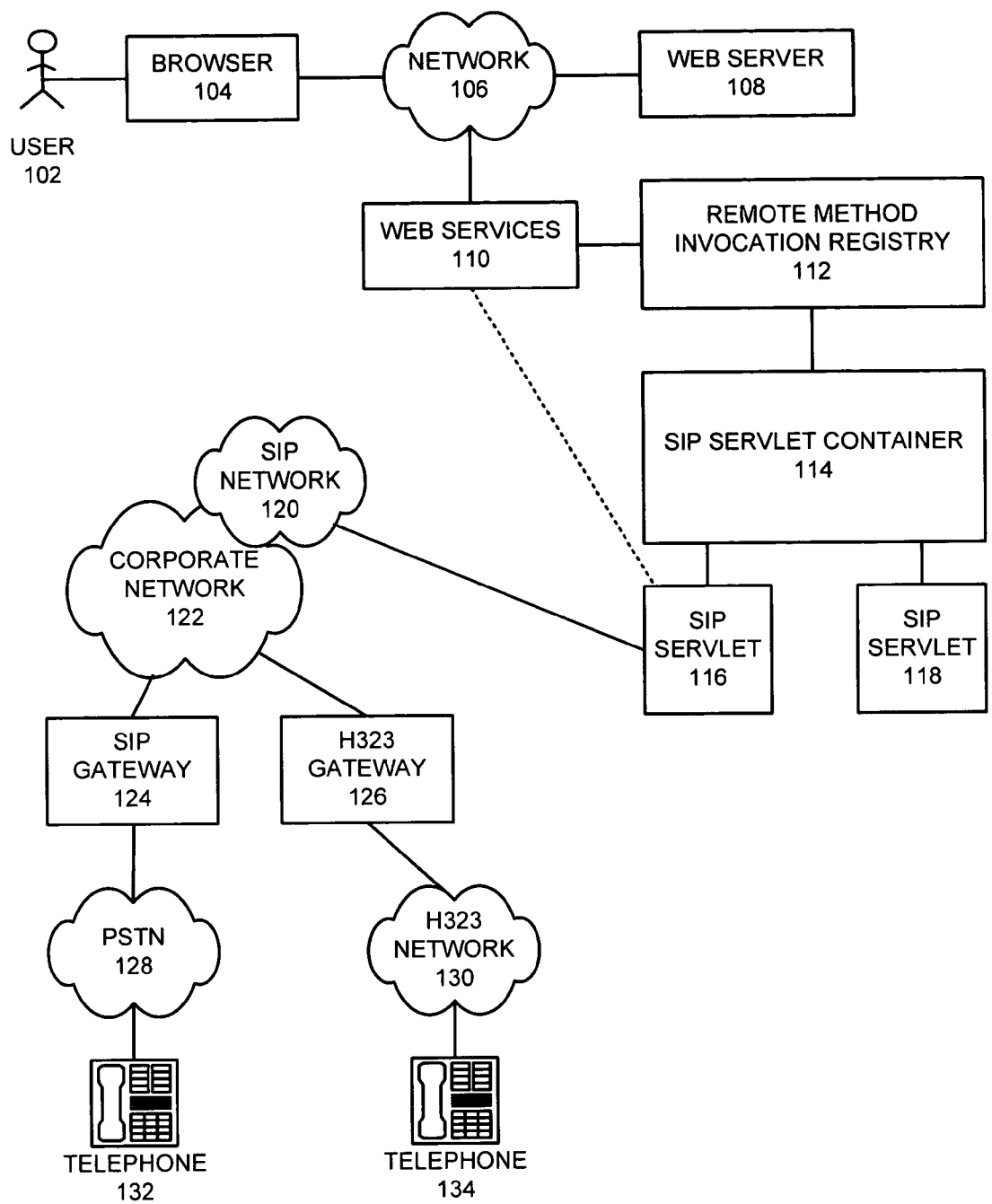
FIG. 1 illustrates web service access to telephony functionality in accordance with an embodiment of the present invention.

FIG. 1 illustrates a system that provides web service access to telephony functionality in accordance with an embodiment of the present invention. This system includes browser 104, network 106, web server 108, web services 110, remote method invocation registry 112, SIP servlet container 114, SIP servlets 116 and 118, SIP network 120, corporate network 122, SIP gateway 124, H323 gateway 126, PSTN 128, H323 network 130, and telephones 132 and 134.

Browser 104 can generally include any type of web browser capable of viewing a web site, such as the INTERNET EXPLORER™ browser distributed by the Microsoft Corporation of Redmond, Wash. Browser 104 allows user 102 to access the functionality provided by web server 108.

Network 106 can generally include any type of wire or wireless communication channel capable of coupling together computing nodes. This includes, but is not limited to, a local area network, a wide area network, or a combination of networks. In one embodiment of the present invention, network 106 includes the Internet.

Web server 108 can generally include any computational node including a mechanism for servicing requests from a client for computational and/or data storage resources. Web server 108 receives requests from browser 104 across network 106 and provides the requested services to browser 104. Web server 108 accesses web services 110 to request and receive services that are not directly available to web server 108. For example, web services 110 can access a distributed database (not shown) to store and retrieve data on behalf of user 102.

Web services 110 receives requests from web server 108 on behalf of user 102 to access telephony functionality. Web services 110, in response, accesses remote method invocation registry 112 to identify a SIP servlet within SIP servlet container 114 to process the request.

SIP servlet container 114 includes SIP servlets, which provide telephony functionality on SIP network 120. For example, SIP servlet 116 may provide "invite" functionality, while SIP servlet 120 may provide "status reporting" functionality. Note that SIP servlet container 114 may include more SIP servlets than shown.

During system initialization, SIP servlet container 114 registers each SIP servlet within SIP servlet container 114 with remote method invocation registry 112. This registration makes each SIP servlet within SIP servlet container 114 available to web services 110.

In one embodiment of the present invention, web services 110 can access the functionality of SIP servlets 116 and 118—and any other SIP servlets—directly without using remote method invocation registry 112 and SIP servlet container 114.

SIP servlets 116 and 118 interface with SIP network 120 to access telephony functionality. SIP network 120 may be coupled with a corporate network 122 as is shown in FIG. 1. Corporate network 122, or alternatively SIP network 120 interfaces to SIP gateway 124. SIP gateway 124 couples SIP network 120 to public switched telephone network (PSTN) 128, which provides access to telephone 132. Corporate network 122, or alternatively SIP network 120 can also interface with H323 gateway 126, which couples SIP network 120 to H323 network 130. H323 network 130 provides access to telephone 134.

Browser Screen

Figure 2:
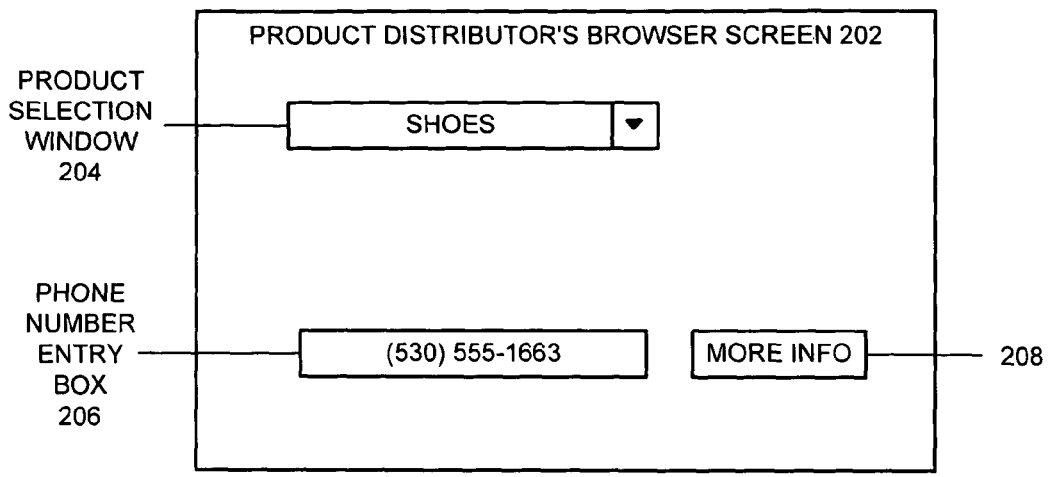
FIG. 2 illustrates a browser screen in accordance with an embodiment of the present invention.

FIG. 2 illustrates an exemplary browser screen in accordance with an embodiment of the present invention. Product distributor's browser screen 202 provides information from a product distributor to user 102. Note that many details displayed on product distributor's browser screen 202 have been eliminated to focus on only the essential elements. During operation, user 102 selects a product in product selection window 204. Note that there are many ways other than a scroll window for user 102 to select the desired product.

Instructions included on product distributor's browser screen 202 direct user 102 to enter a telephone number into phone number entry box 206 and then click on more info button 208. In response to this action, user 102 will receive a phone call at the entered number, wherein the telephone call provides user 102 with more information about the selected product.

When user 102 clicks on more info button 208, web server 108 requests telephony access from web services 110. In response to this request, web services 110 selects a SIP servlet, say SIP servlet 116, to access SIP network 120 and to initiate the telephone call.

Initializing Web Service Access

Figure 3:
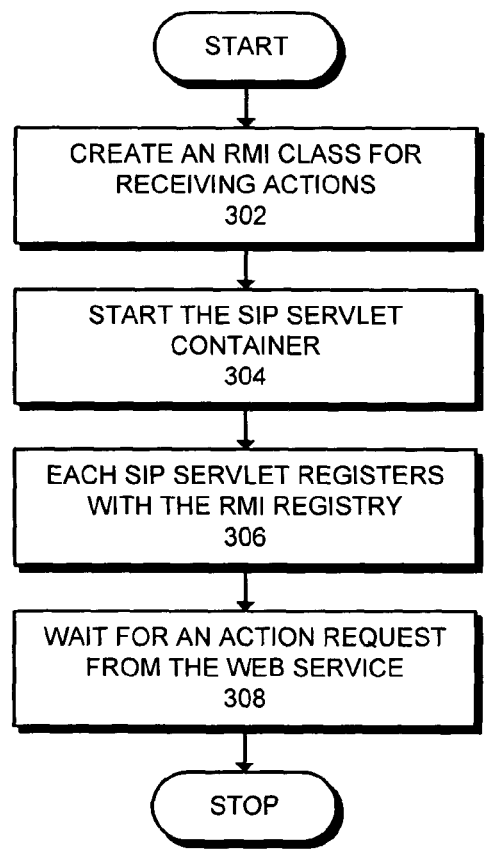
FIG. 3 presents a flowchart illustrating the process of initializing web service access to telephony functionality in accordance with an embodiment of the present invention.

FIG. 3 presents a flowchart illustrating the process of initializing web service access to telephony functionality in accordance with an embodiment of the present invention. The system starts when a remote method invocation class for receiving actions is created (step 302). Next, the system starts the SIP servlet container (step 304).

After the SIP servlet container has been started, each SIP servlet within the SIP servlet container registers with the remote method invocation (RMI) registry (step 306). The system then waits for an action request from the web service (step 308).

Web Service Access

Figure 4:
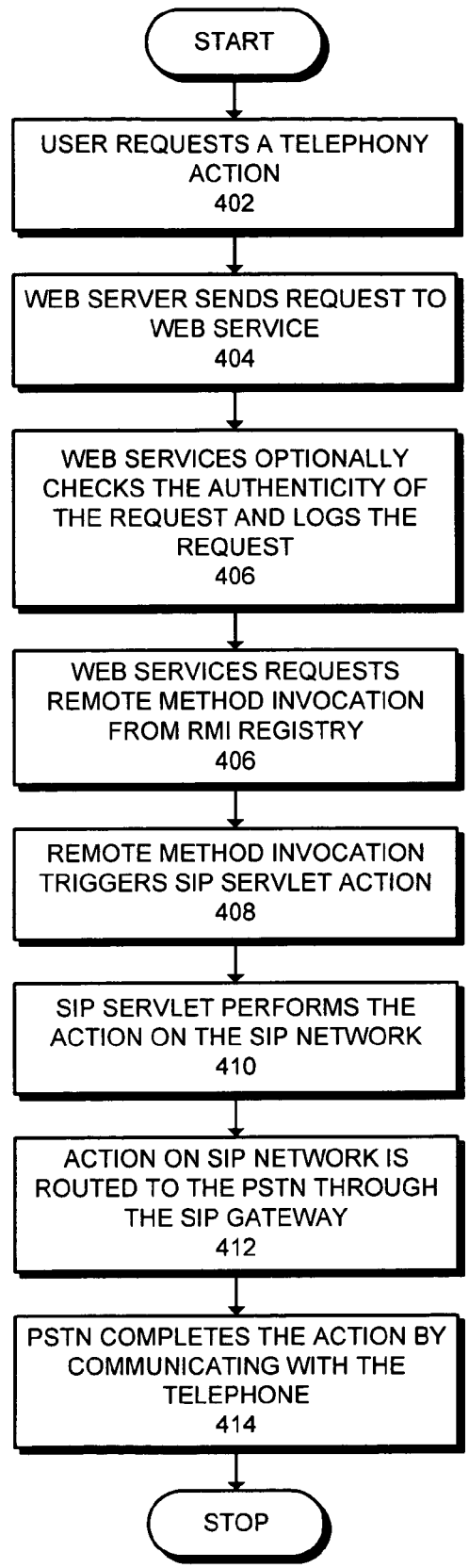
FIG. 4 presents a flowchart illustrating the process of web service access to telephony functionality in accordance with an embodiment of the present invention.

FIG. 4 presents a flowchart illustrating the process of web service access to telephony functionality in accordance with an embodiment of the present invention. The system starts when a request is received from user 102 at web server 108 to initiate a telephony action (step 402). In response, web server 108 sends a request to web services 110 to initiate the telephony action on SIP network 120 (step 404).

Web services 110 optionally checks the authenticity of the request and/or logs the request (step 406). Next, web services 110 requests remote method invocation of a SIP servlet from RMI registry 112 to process the request (step 408). In response, RMI registry 112 triggers an action from a SIP servlet, say SIP servlet 116, to interface web services 110 with SIP network 120 (step 410).

SIP servlet 116 then initiates the desired action on SIP network 120 (step 410). Next, the action causes a communication between SIP network 120 and PSTN network 128 through SIP gateway 124 (step 412). The action additionally involves a communication between PSTN 128 and telephone 132 (step 414).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate web service access to telephony functionality, comprising:

allowing a user to enter a request for a telephony action through a web browser over the Internet, wherein the web browser is capable of viewing a web site and allowing access to the functionality provided by a web server;

receiving the user request at a web server to access the telephony functionality on a public switched telephone network (PSTN) through a Voice Over Internet Protocol (VOIP) network, and wherein the VOIP network comprises a session initiation protocol (SIP) network which comprises a plurality of SIP servlets that are members of a SIP servlet container, sending the user request to a web service, wherein the web service provides a service not directly available to the web server;

in response to the request, selecting an interface between the web service and the VOIP network, wherein selecting the interface comprises identifying and selecting a SIP servlet for processing the request;

allowing the SIP servlet to initiate the telephony action specified in the user request on the VOIP network;

allowing the telephony action to cause a communication between the VOIP network and the PSTN, and a communication between the PSTN and a telephone;

routing the telephony functionality to the PSTN through the interface; and accessing the telephony functionality on the PSTN over the VOIP network.

2. The method of claim 1, wherein the SIP servlet is registered with a remote method invocation (RMI) registry.

3. The method of claim 2, wherein selecting the interface to the VOIP network SIP servlet involves accessing the RMI registry.

4. The method of claim 1, wherein the SIP network is coupled to an H323 network, wherein the H323 network facilitates audiovisual communication on local area networks.

5. A computer-readable storage device storing instructions that when executed by a computer cause the computer to perform a method to facilitate web service access to telephony functionality, the method, comprising:

allowing a user to enter a request for a telephony action through a web browser over the Internet, wherein the web browser is capable of viewing a web site and allowing access to the functionality provided by a web server;

receiving the user request at a web server to access the telephony functionality on a public switched telephone network (PSTN) through a Voice Over Internet Protocol (VOIP) network, and wherein the VOIP network comprises a session initiation protocol (SIP) network which comprises a plurality of SIP servlets that are members of a SIP servlet container, sending the user request to a web service, wherein the web service provides a service not directly available to the web server;

in response to the request, selecting an interface between the web server and the VOIP network, wherein selecting the interface comprises identifying and selecting a SIP servlet for processing the request;

allowing the SIP servlet to initiate the telephony action specified in the user request on the VOIP network;

allowing the telephony action to cause a communication between the VOIP network and the PSTN, and a communication between the PSTN and a telephone;

routing the telephony functionality to the PSTN through the interface; and accessing the telephony functionality on the PSTN over the VOIP network.

6. The computer-readable storage medium device of claim 5, wherein the SIP servlet is registered with a remote method invocation (RMI) registry.

7. The computer-readable storage device of claim 6, wherein selecting the SIP servlet involves accessing the RMI registry.

8. The computer-readable storage device of claim 5, wherein the SIP network is coupled to an H323 network, wherein the H323 network facilitates audiovisual communication on local area networks.

9. An apparatus to facilitate web service access to telephony functionality, comprising:

an entering mechanism allowing a user to enter a request for a telephony action through a web browser over the Internet, wherein the web browser is capable of viewing a web site and allowing access to the functionality provided by a web server;

a receiving mechanism configured to receive the user request at a web server to access the telephony functionality on a public switched telephone network (PSTN) through a Voice Over Internet Protocol (VOIP) network, and wherein the VOIP network includes a session initiation protocol (SIP) network which comprises a plurality of SIP servlets that are members of a SIP servlet container, a sending mechanism configured to sending the user request to a web service, wherein the web service provides a service not directly available to the web server;

a selecting mechanism configured to selecting an interface between the web service and the VOIP network in response to the request, wherein the selecting the interface comprises identifying and selecting a SIP servlet for processing the request;

and allowing a mechanism configured to allowing the SIP servlet to initiate the telephony action specified in the user request on the VOIP network; and allowing the telephony action to cause a communication between the VOIP network and the PSTN, and a communication between the PSTN and a telephone;

and routing mechanism configured to route the telephony functionality to the PSTN through the interface; and and accessing mechanism configured to access the telephony functionality on the PSTN over the VOIP network.

10. The apparatus of claim 9, wherein the SIP servlet is registered with a remote method invocation (RMI) registry.

11. The apparatus of claim 10 wherein selecting the SIP servlet involves accessing the RMI registry.

12. The apparatus of claim 9, wherein the SIP network is coupled to an H323 network, wherein the H323 network facilitates audiovisual communication on local area networks.

* * * * *

UNITED STATES PATENT AND TRADEMARK OFFICE
CERTIFICATE OF CORRECTION

| | |
|---|---|
| PATENT NO. | : 7,480,286 B2 |
| APPLICATION NO. | : 10/655647 |
| DATED | : January 20, 2009 |
| INVENTOR(S) | : Wong |

Page 1 of 1

It is certified that error appears in the above-identified patent and that said Letters Patent is hereby corrected as shown below:

In column 5, lines 20-21, in Claim 3, after "the" delete "interface to the VOIP network".

In column 5, line 30, in Claim 5, delete "method," and insert -- method --, therefor.

In column 5, line 39, in Claim 5, delete "comprises" and insert -- includes --, therefor.

In column 5, line 40, in Claim 5, delete "comprises" and insert -- includes --, therefor.

In column 6, line 3, in Claim 6, after "storage" delete "medium".

In column 6, line 49, in Claim 11, delete "10" and insert -- 10, --, therefor.

Signed and Sealed this

Fourth Day of May, 2010

David J. Kappos
*Director of the United States Patent and Trademark Office*